US012779966B2

(12) United States Patent
Harriman

(10) Patent No.: US 12,779,966 B2
(45) Date of Patent: Nov. 3, 2026

(54) PAD-BASED SURFACE PROTECTION SYSTEM AND METHOD OF USE

(71) Applicant: Brian Harriman, Franklin, TN (US)

(72) Inventor: Brian Harriman, Franklin, TN (US)

(73) Assignee: Bentley Designs LLC, Franklin, TN (US)

( * ) Notice: Subject to any disclaimer, the term of this patent is extended or adjusted under 35 U.S.C. 154(b) by 251 days.

(21) Appl. No.: 18/665,010

(22) Filed: May 15, 2024

(65) Prior Publication Data

US 2025/0262920 A1 Aug. 21, 2025

Related U.S. Application Data

(60) Provisional application No. 63/503,603, filed on May 22, 2023.

(51) Int. Cl.

*B60J 11/06* (2006.01)
*B60Q 1/50* (2006.01)
*G09F 7/18* (2006.01)
*G09F 21/04* (2006.01)

(52) U.S. Cl.

CPC ................. *B60J 11/06* (2013.01); *G09F 7/18* (2013.01); *G09F 21/048* (2013.01); *B60Q 1/503* (2013.01); *G09F 2007/1865* (2013.01)

(58) Field of Classification Search

CPC ........... B60J 11/06; G09F 7/18; G09F 21/048; G09F 2007/1865; B60Q 1/503
See application file for complete search history.

(56) References Cited

U.S. PATENT DOCUMENTS 2,540,340 A * 2/1951 Linblade ................ A01K 97/06 224/183
2,919,141 A * 12/1959 Hughes .................... B60J 11/06 280/727
3,546,643 A * 12/1970 Virostek ............... H01F 7/0215 335/303
3,665,355 A * 5/1972 Sasaki ................... H01F 7/0215 428/102
4,531,560 A * 7/1985 Balanky ................... B60J 11/06 296/136.03
4,598,883 A * 7/1986 Suter ....................... B64F 1/005 244/1 R (Continued)

FOREIGN PATENT DOCUMENTS

CA 1299610 C 4/1992

OTHER PUBLICATIONS

International Search Report and Written Opinion of the International Search Authority in PCT/US2025/028456 mailed Jul. 9, 2025.

*Primary Examiner* — Jacob B Meyer
(74) *Attorney, Agent, or Firm* — Master Key IP, LLP; Jeromye V. Sartain

(57) ABSTRACT

A pad-based surface protection system includes one or more pads, each pad having one or more sheets of cushion, a plurality of magnets of predetermined size and lateral spacing selectively positioned at a predetermined depth within the one or more sheets of cushion, and a cover removably and selectively receiving the one or more sheets of cushion, the cover having a face side and an opposite exposed side joined so as to allow the cover to fit on the one or more sheets of cushion, the face and exposed sides of the cover formed of textile materials.

18 Claims, 5 Drawing Sheets

(56) References Cited

U.S. PATENT DOCUMENTS

| | | | | | |
|---|---|---|---|---|---|
| 4,781,231 | A * | 11/1988 | Garcia | B60J 11/06 224/543 |
| 4,810,015 | A * | 3/1989 | McNeil | B60J 11/06 296/136.03 |
| 4,827,997 | A * | 5/1989 | Rolan | B60J 11/00 150/166 |
| 4,849,272 | A * | 7/1989 | Haney | B25H 5/00 428/102 |
| 4,974,892 | A * | 12/1990 | Huard | B60Q 5/006 293/128 |
| 5,273,316 | A * | 12/1993 | Infante | B05B 12/24 296/136.01 |
| 5,312,145 | A * | 5/1994 | McNeil | B60J 11/06 293/126 |
| 5,320,392 | A * | 6/1994 | Hart | B60R 13/04 293/120 |
| 5,945,194 | A * | 8/1999 | Pester | B60J 11/06 428/192 |
| 6,152,487 | A * | 11/2000 | Crick | B60J 11/06 293/112 |
| 6,371,547 | B1 * | 4/2002 | Halbrook | B60J 11/00 150/166 |
| 6,406,080 | B1 * | 6/2002 | Davis | B60R 19/42 296/136.01 |
| 6,587,022 | B1 * | 7/2003 | Devine | A45F 5/00 211/DIG. 1 |
| 6,588,827 | B2 * | 7/2003 | Heiland | B60J 11/06 296/136.12 |
| 6,926,339 | B2 * | 8/2005 | Gentile | B60R 19/44 296/136.07 |
| 7,100,965 | B1 * | 9/2006 | Stover | B60J 11/06 296/136.03 |
| 7,182,391 | B2 * | 2/2007 | Thrasher | B60J 11/00 296/136.02 |
| 7,243,975 | B2 * | 7/2007 | Harcourt | B60J 11/00 296/136.01 |
| 7,677,637 | B2 * | 3/2010 | Aydar | B60J 11/06 296/136.01 |
| 7,762,362 | B2 * | 7/2010 | Cutkosky | B62D 57/024 180/8.5 |
| 9,517,610 | B2 * | 12/2016 | Parness | B25J 15/008 |
| 9,522,767 | B1 * | 12/2016 | Pass | G09F 21/04 |
| 9,526,309 | B2 * | 12/2016 | Huyke-Phillips | A45C 11/16 |
| 9,545,837 | B2 * | 1/2017 | Garfield | B60R 13/04 |
| 9,669,693 | B1 * | 6/2017 | Adams | B60J 11/06 |
| 9,688,216 | B1 * | 6/2017 | Rinetti | B60R 13/01 |
| 9,862,258 | B2 * | 1/2018 | Schmidt | E06B 7/00 |
| 9,889,732 | B2 * | 2/2018 | Helb | B60J 11/04 |
| 9,994,097 | B2 * | 6/2018 | Ching | B60J 11/04 |
| 10,493,832 | B1 * | 12/2019 | White | B60J 11/06 |
| 11,565,642 | B2 * | 1/2023 | Schmidt | B60R 19/42 |
| 11,713,004 | B2 * | 8/2023 | Hockly | G09F 9/30 40/594 |
| 2001/0007395 | A1 * | 7/2001 | Gentile | B60J 11/00 296/136.1 |
| 2018/0111466 | A1 * | 4/2018 | Ching | B60J 11/04 |
| 2018/0194302 | A1 * | 7/2018 | Yates | B60J 11/06 |
| 2019/0061645 | A1 * | 2/2019 | Green | B60J 11/06 |
| 2019/0213931 | A1 * | 7/2019 | Brubaker | B60Q 1/2607 |
| 2020/0047598 | A1 * | 2/2020 | Garcia | B60J 11/04 |
| 2025/0262920 | A1 * | 8/2025 | Harriman | G09F 21/048 |

* cited by examiner

Fig. 5
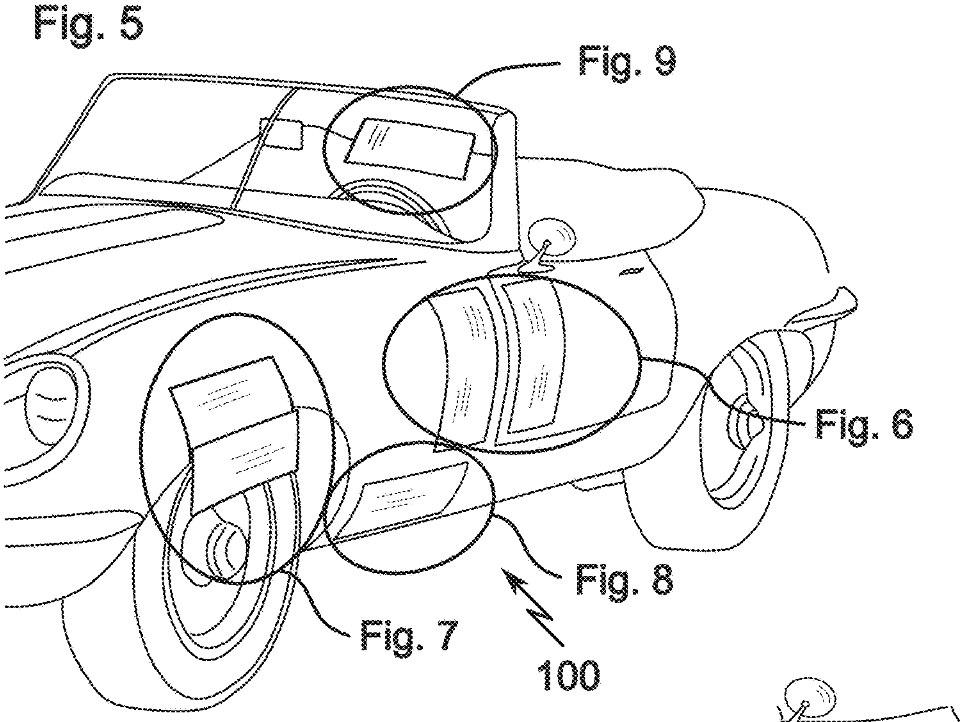
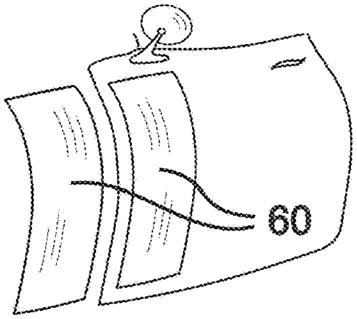
Fig. 6
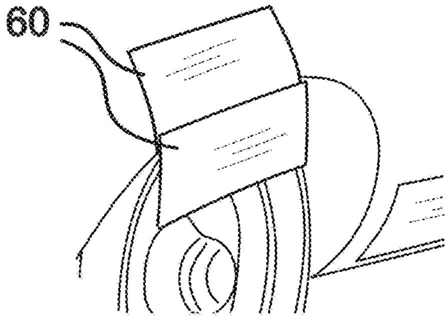
Fig. 7
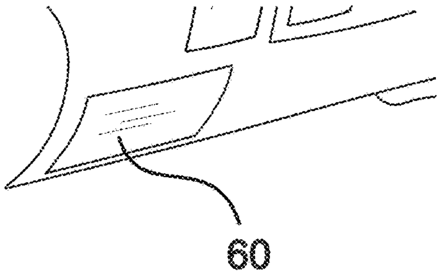
Fig. 8
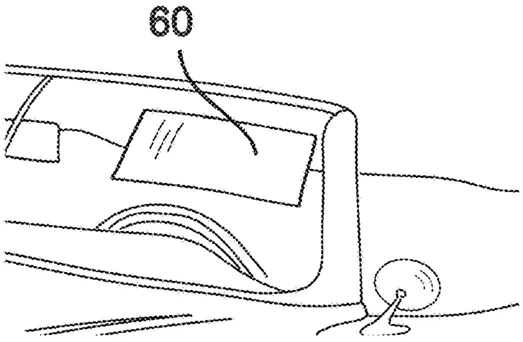
Fig. 9

Fig. 13
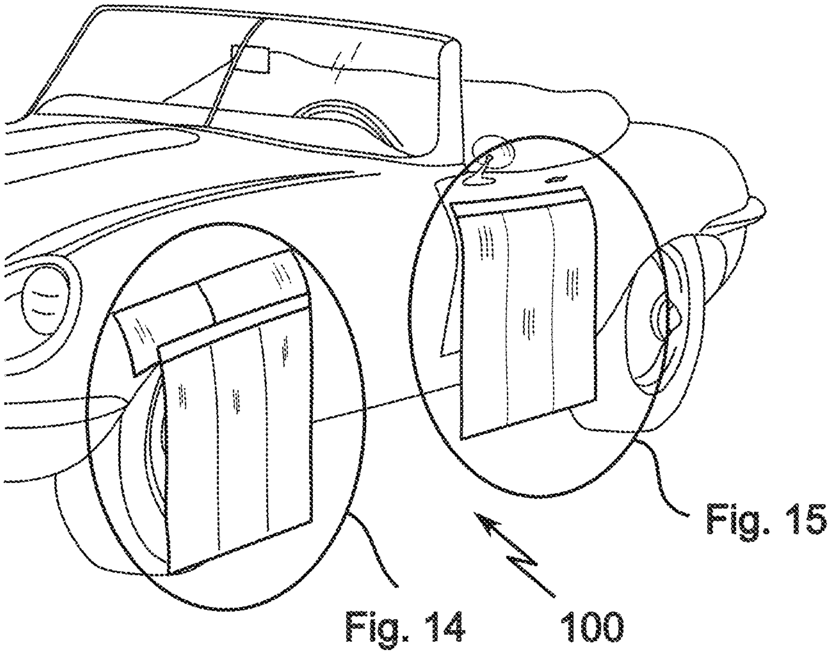
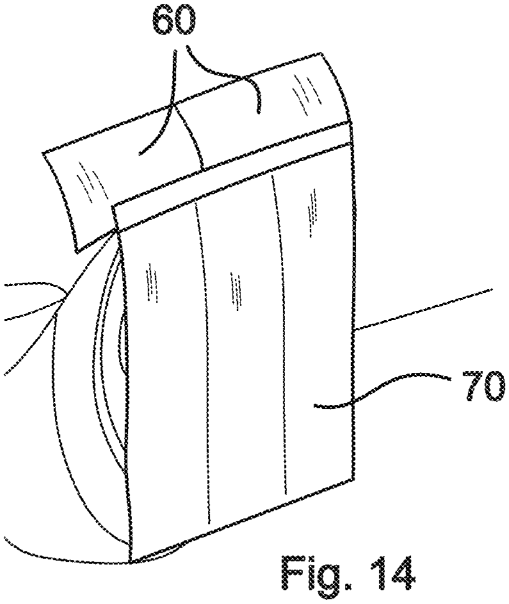
Fig. 14
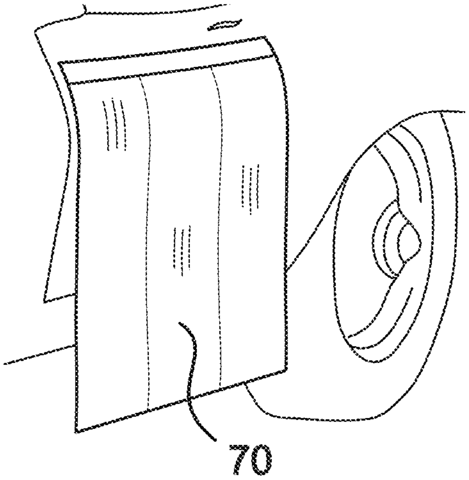
Fig. 15

PAD-BASED SURFACE PROTECTION SYSTEM AND METHOD OF USE

RELATED APPLICATION

This non-provisional patent application claims priority pursuant to 35 U.S.C. § 119(e) to and is entitled to the filing date of U.S. Provisional Patent Application Ser. No. 63/503,603 filed May 22, 2023, and entitled "Pad-Based Surface Protection System and Method of Use." The contents of the aforementioned application are incorporated herein by reference.

BACKGROUND

The subject of this patent application relates generally to protective parts and systems, and more particularly to a pad-based surface protection system configured for protecting surfaces from various hazards, undesired observation, and impacts or abrasions.

The following description includes information that may be useful in understanding the present invention. It is not an admission that any of the information provided herein is prior art or relevant to the presently claimed invention, or that any publication specifically or implicitly referenced is prior art.

Applicant hereby incorporates herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, there is a long design history of vehicle covers, fender covers, protection pads, plastic shields, towels, foam cushions, magnetic vinyl pads, and similar items for situations where surface protection of various objects is desired. The present inventor worked in the classic car restoration industry and observed that such protective equipment is seldom purchased, supplied, or used, even when the slightest inadvertent damage to a vehicle would entail great expense, labor, and waste of materials.

Valuable items are exposed to many kinds of hazards. In the automotive industry alone there are countless threats—cars are frequently moved, tools are fumbled or dropped, welders and grinders produce sparks, long objects are carelessly swung near or between cars. Even the smallest marring, scratching, or denting of a surface can lead to thousands of dollars lost in labor, paint correction, vehicle devaluation, and months of delay on a project. Despite these and countless other threats, owners, shops, and mechanics rarely provide or use any protective devices. There are a number of reasons for this, however, the principal reason is primarily due to deficiencies in prior art solutions.

The most common form of protection used in automotive shops is the fender cover. These devices lay over a fender and extend into the open engine bay. Some are kept in position through balance and friction, some use hooks, and a few utilize magnets. One of the main deficiencies of fender covers is that the face side is constantly exposed to the dirty environment of the engine bay, which in turn requires that it can be easily wiped clean. This necessitates the use of non-woven materials such as foam, vinyl, rubber, or plastic. Non-woven materials are not optimal for contact with highly refined finishes because the trapping of any contaminate between themselves and the finish can result in scratching. Additionally, covers which occupy a gap between hinged panels such as a hood and fender can accidentally be pinched between the two panels and cause damage to either or both panels as well as to the cover.

The next most commonly used form of shop protection is the whole-vehicle cover. These are designed primarily for water or dust protection, and this purpose limits their use in the shop. They are large and difficult to deploy and stow. They cover and obstruct doors, windows, trunk lids, and hoods, so mechanics have to pull them back, leaving large areas exposed and creating a pinch threat. They easily sag or fall to the floor and pick up dirt, yet their large size renders them unable to be washed without special equipment. When used outdoors, covers can cause considerable surface wear and abrasion when whipped by the wind, especially if they are dirty or if dust blows up under them.

Other kinds of protection devices such as pads, blankets, or welding blankets, even anti-ballistic devices, have limitations that make their use impractical. Many prior art pads and covers depend on straps and hooks to hold themselves onto a surface, such as shown, for example, in U.S. Pat. Nos. 4,531,560 and 4,598,883. Straps are cumbersome and tend to tangle, and hooks pose a threat to pinching between panels or scratching a finish if they slip or come undone. Straps and hooks also are dependent upon an appropriate location to secure them to.

Some protective pads use magnets, such as disclosed, for example, in U.S. Pat. Nos. 3,665,355, 5,312,145, and 5,320,392. If magnets are not exceptionally strong, they need to either contact the protected surface or come extremely near to it. If contacting, they can clunk or scratch, and if too far they fail to provide adequate force to keep a pad in place, especially in a vertical or inverted orientation of the pad. Magnets of course require ferromagnetic metals to interact with and are not attracted to a vast number of common substances such as aluminum, glass, plastic, carbon fiber, or fiberglass.

Magnets have an additional limitation in that they attract loose metallic dust, shavings, and burrs. To mitigate this, most prior art has paired magnets with smooth materials which can be wiped clean such as vinyl, plastic, or rubber. Woven textiles, which are optimal for contact with fine finishes, have been used in some prior art, such as seen, for example, in U.S. Pat. No. 4,849,272, but risk becoming permanently fouled with metal particles because the woven textile is inseparable from the respective pad and magnets to which it is affixed.

Some kinds of protection use suction cups for attachment, such as disclosed, for example, in U.S. Pat. No. 4,974,892. Cups require a smooth, non-porous surface. With rough surfaces they come loose and the protection device can potentially fall and pick up dirt. Suction cups have a limited lifespan before they dry out and become brittle, and without an easy means of replacing them, they can render the entire pad unusable. Pads that rely solely on cups encounter numerous limitations in use.

Other kinds of protection utilize adhesive tapes such as double-sided or painter's tape. Drawbacks of this approach are that tape is expensive, wasteful, and there is time involved with application and removal/disposal. Tape also presents a risk of lifting paint off when pulled away, or alternately, remaining on a finish in a manner difficult to remove. Additionally, the surface of the pad must be an appropriate material that doesn't create a problem where the tape leaves adhesive behind on the pad after removal, requiring even more labor in keeping the pad clean.

There are a number of nascent technology anisotropic adhesion pads. Anisotropic force is also known as the van der Waals force and is derived from electrostatic adhesion, similar to how a Gecko maintains grip on vertical or inverted surfaces. Surprisingly strong forces can be generated. For instance, an anisotropic pad of several inches in diameter can support nearly a hundred pounds.

What has been needed and heretofore unavailable is a pad-based surface protection system and method of use that overcomes such disadvantages in prior art protection devices as summarized above. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a pad-based surface protection system. In at least one embodiment, the pad-based surface protection system comprises one or more pads, each pad comprising one or more sheets of cushion, a plurality of magnets of predetermined size and lateral spacing selectively positioned at a predetermined depth within the one or more sheets of cushion, and a cover removably and selectively receiving the one or more sheets of cushion, the cover comprised of a face side and an opposite exposed side joined so as to allow the cover to fit on the one or more sheets of cushion, the face and exposed sides of the cover formed of textile materials.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 5 is a partial perspective view of a first exemplary embodiment pad of FIGS. 1-4 installed in various locations upon a vehicle;

FIG. 6 is an enlarged partial perspective view of two first exemplary embodiment pads affixed to the side of a vehicle in a particular arrangement;

FIG. 7 is an enlarged partial perspective view of one first exemplary embodiment pad joined to a like pad which is in turn affixed to a vehicle;

FIG. 8 is an enlarged partial perspective view of a first exemplary embodiment pad affixed to an inverted part of a vehicle;

FIG. 9 is an enlarged partial perspective view of a first exemplary embodiment pad affixed to a non-ferrous surface of a vehicle by means of suction cups;

FIG. 13 is a perspective view of a second exemplary embodiment pad of FIGS. 10-12 installed variously upon a vehicle;

FIG. 14 is an enlarged perspective view showing one second exemplary embodiment pad joined to and suspended from two first exemplary embodiment pads which are themselves affixed to the side of a motor vehicle;

FIG. 15 is an enlarged perspective view of a second exemplary embodiment pad affixed on the side of a vehicle;

Figure 1:
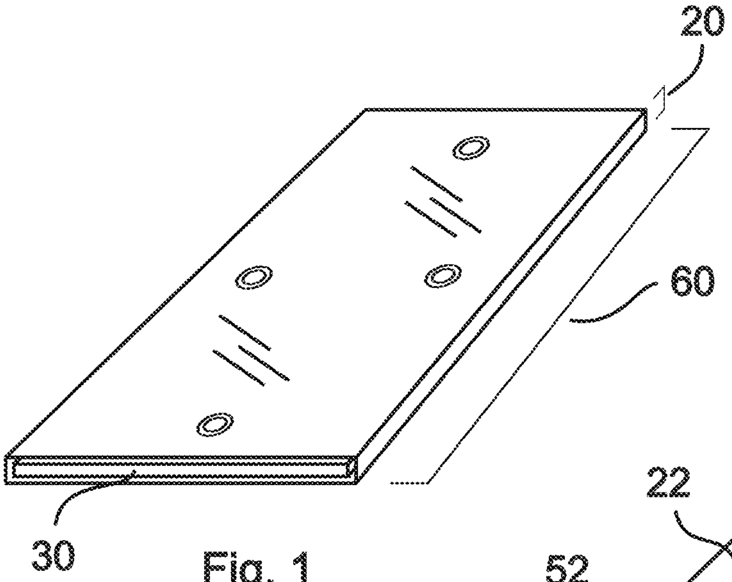
FIG. 1 is a perspective view showing an assembled first exemplary embodiment pad.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims. By way of further illustration and not limitation, while the drawings show a single sheet or layer of cushion 30, 32, the invention is not so limited but may include two or more sheets or layers of cushion 30, 32 in a single pad 60, 70 or housed within a single cover 20, 72 without departing from the spirit and scope of the present invention.

FIG. 1 illustrates a first exemplary embodiment pad 60 comprised of a cover 20 enveloping a cushion 30.

Figure 2:
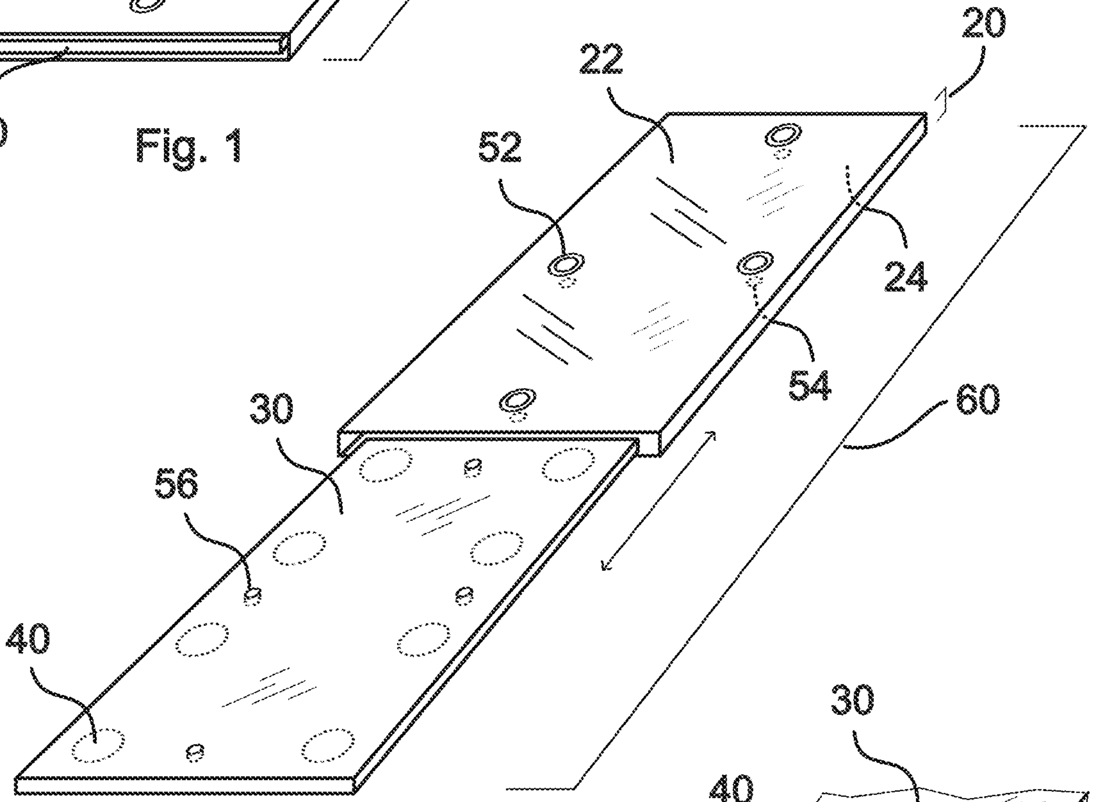
FIG. 2 is a partially exploded perspective view thereof showing the principal elements of the cushion and cover.

FIG. 2 illustrates a cover 20 separated from a cushion 30. Cover 20 is comprised of an external or exposed side 22 and an opposite face side 24. The exposed side 22 and face side 24 of the cover 20 are joined along two or three edges by stitching. Magnets 40 of various number and size and strength are placed within the cushion 30 at predetermined locations. A hole with grommet 52 affixed through the exposed side 22 of the cover 20, a hole 54 provisioned through the face side 24 of the cover 20, and a hole 56 through the cushion 30 are each provided in alignment for accepting the installation of a suction cup 50 (as shown in FIG. 4) of predetermined number and locations.

Figure 3:
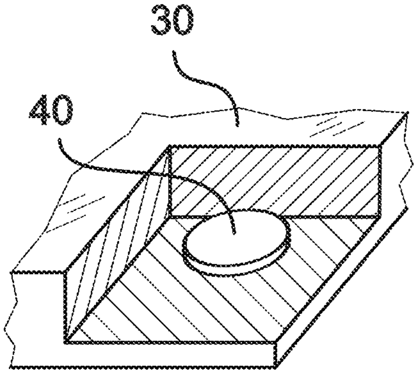
FIG. 3 is an enlarged partial cutaway view thereof showing a magnet positioned within a cushion.

FIG. 3 illustrates a magnet 40 placed within a cushion 30. Depth of the magnet 40 vertically within the cushion 30 or relative to its thickness can be produced by routing out a placement area for the magnet 40, installing the magnet 40, and then sealing the resultant area with additional cushion material so that both sides of the magnet 40 are encased within the cushion 40 and thus the pad 60 (FIGS. 1 and 2).

Figure 4:
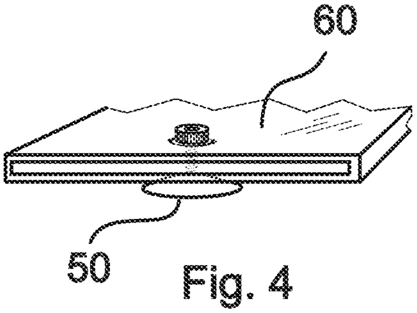
FIG. 4 is a partial perspective view thereof showing a suction cup affixed through the first exemplary embodiment pad.

FIG. 4 depicts a suction cup 50 installed through a first exemplary embodiment pad 60 by means of the grommet 52 formed in the exposed side 22 of the cover 20, the hole 56 formed in the cushion 30, and the hole 54 formed in the face side 24 of the cover 20 (each shown in FIG. 2).

FIGS. 5-9 depict a plurality of first exemplary embodiment pads 60 and their general size, situated in various positions on a vehicle, and that whether the one or more pads 60 are employed separately or are interconnected, such one or more pads 60 together defining a pad-based surface protection system 100.

FIG. 6 taken from oval "FIG. 6" of FIG. 5 depicts two first exemplary embodiment pads 60 placed in such a manner as to protect portions of adjoining panels which move in relation to each other, but not occupy the gap between those panels, here such panels shown as being a door and an adjacent body panel of a vehicle.

FIG. 7 taken from oval "FIG. 7" of FIG. 5 depicts two first exemplary embodiment pads 60 placed such that a first pad 60 is affixed to a vehicle surface and the second pad 60 is affixed to and suspended by the first pad 60 over an open area.

FIG. 8 taken from oval "FIG. 8" of FIG. 5 depicts a first exemplary embodiment pad 60 placed on and adhering to an inverted section of a vehicle.

FIG. 9 taken from oval "FIG. 9" of FIG. 5 depicts a first exemplary embodiment pad 60 affixed to a non-metallic surface of a vehicle via suction cups.

The manner of using a first exemplary embodiment pad 60 is to apply or adhere it to a surface by means of magnet, suction cup, or tape.

The cover 20 is made removable from the one or more sheets or layers of cushion 30 by leaving one or two sides of the cover 20 not joined to each other, thus creating an opening from which the cover 20 can be separated from the cushion 30 or, said another way, the cushion 30 can be slidably removed from the cover 20.

The cover 20 is comprised of two sides, an external or exposed side 22 and an opposite face side 24, which can be fashioned of similar or dissimilar material according to purpose and joined together along two or more edges by any appropriate means now known or later developed, including but not limited to stitching, bonding, gluing, and welding. For instance, the face side 24 could be composed of soft textile material appropriate for contact with fine finishes or of a material capable of anisotropic adhesive qualities. The exposed side 22 could be composed of marine-grade canvas or flame retardant material. Those skilled in the art will appreciate that any such materials now known or later developed may be employed, such that the indicated materials are to be understood as illustrative and non-limiting. The cover 20 can optionally provide means for accepting suction cups 50, including but not limited to the exemplary grommets 52 and holes 54, with corresponding holes 56 formed in the one or more sheets of cushion 30. Suction cups 50 are preferably of a threaded stem and nut configuration to allow for secure fit and easy replacement. Plastic stem and nuts are preferred in order to reduce risk of scratching any surface by accident. The cover 20 is fashioned to fit with appropriate slack to allow for inclusion of additional cushion types or material.

The cushion 30 is composed of optional materials depending on purpose. Ethylene Vinyl Acetate (EVA) foam and similar substances are relatively flexible and soft, but stiff enough to maintain the shape of the cover 20 and thus the overall pad 60 when assembled. For greater impact resistance, the cushion 30 can be composed of relatively firm or dense or rigid materials such as thin high-grade plywood, plastic sheeting, or carbon fiber. A moderation of qualities can be attained by combining soft and firm materials. Any such materials now known or later developed and in any combination may be employed in a cushion 30 according to aspects of the present invention without departing from its spirit and scope.

The magnets 40 are selected based on considerations such as cost, size, weight, and the pull force needed for the particular purpose. High quality rare-earth magnets are preferred for their high pull force and as such should not come into direct contact with delicate or refined surfaces. To accommodate this, any such magnets 40 are preferably embedded within the cushion 30 so as to be covered on both sides. This reduces the chance that the magnets 40 will become dislodged from the cushion 30 or directly contact the protected surface and provides for positioning them within the cushion 30 in an offset manner or at a predetermined depth relative to the thickness of the cushion 30, or effectively at varying depths from the face side 24 of the cover 20 when the cover 20 is placed over the one or more sheets of cushion 30. That is, such offset manner of magnet 40 placement within the cushion 30 is to say that the magnets 40 are not equidistant from both major longitudinal surfaces of the cushion 30 or that the predetermined depth of the magnets 40 does not place the magnets 40 along the longitudinal central plane of the cushion 30. Such an offset placement of the magnets 40 within the cushion 30 creates the ability to gain different pull force or attractive force characteristics from the same magnet 40 depending on the orientation of the cushion 30 within the cover 20 when the pad 60 is presented to a surface, as by having the magnets 40 either relatively closer to or relatively farther from the face side 24 of the cover 20. All magnets 40 are preferably installed at the same predetermined depth within the cushion 30 for uniform adhesion to a surface and with the same pole alignment to aid with connection of pads 60 to each other.

Affixing of adjoining pads 60 as depicted in FIG. 7 allows for one pad 60 to support or hold another pad 60 over an area without ready means of attachment. Additionally, it allows for pads 60 to be stacked to each other for added protection, size or thickness, or storage.

Magnetic, suction, or tape attachment allows for pads 60 to be placed upon or attached to vertical or inverted surfaces as shown in FIG. 8. Suction or tape attachment allows for pads 60 to be placed upon or attached to surfaces that do not provide magnetic attraction as shown in FIG. 9.

Figure 10:
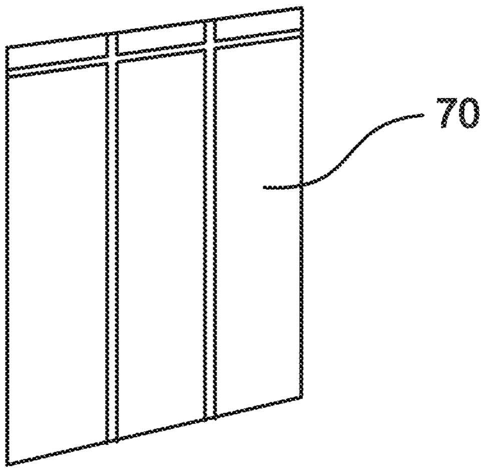
FIG. 10 is a perspective view of a second exemplary embodiment pad.

FIG. 10 depicts a second exemplary embodiment pad 70.

Figure 11:
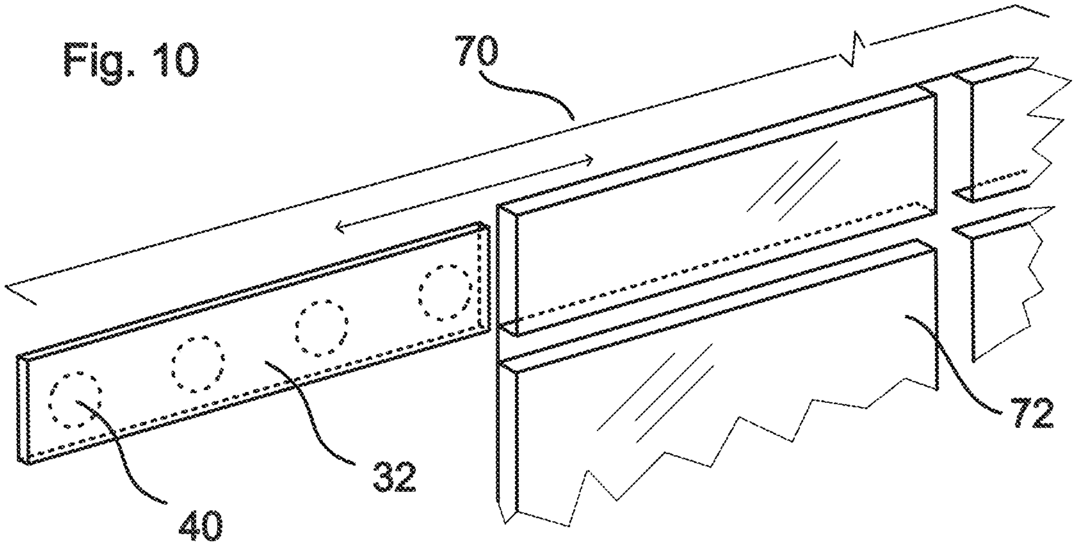
FIG. 11 is an enlarged exploded perspective view thereof.

FIG. 11 illustrates a second exemplary embodiment pad 70 with cover 72 separated from cushion 32 and embedded magnet(s) 40.

Figure 12:
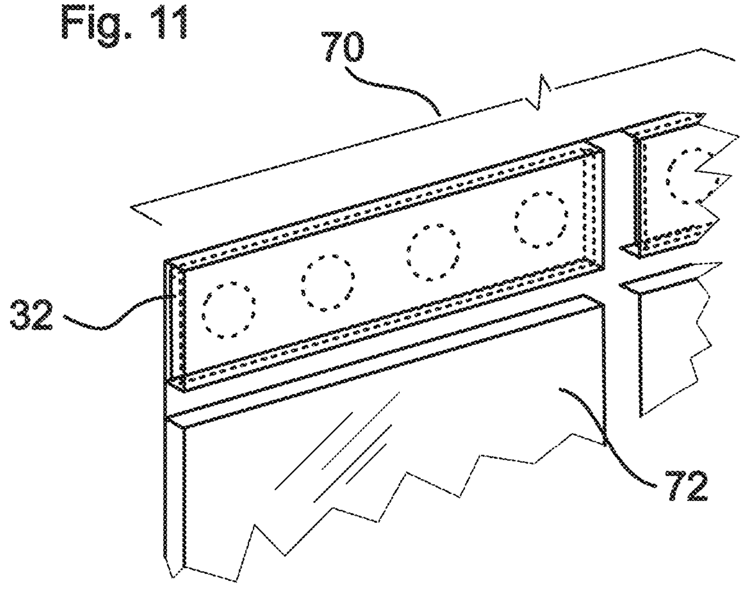
FIG. 12 is a perspective view thereof as assembled.

FIG. 12 illustrates an assembled second exemplary embodiment pad 70 comprised of a cover 72 and a cushion or cushions 32.

FIGS. 13-15 depict first exemplary embodiment pads 60 and second exemplary embodiment pads 70 situated in various positions on a vehicle, and that whether the one or more pads 60, 70 are employed separately or are interconnected, such one or more pads 60, 70 together defining a pad-based surface protection system 100.

FIG. 14 taken from oval "FIG. 14" of FIG. 13 depicts two first exemplary embodiment pads 60 affixed to a vehicle and one second exemplary embodiment pad 70 affixed to and suspended by the first exemplary embodiment pads 60 over an open area.

FIG. 15 taken from oval "FIG. 15" of FIG. 13 depicts a second exemplary embodiment pad 70 and its general size, affixed to a vehicle.

The manner of using a second exemplary embodiment pad 70 is again to apply or adhere it to a surface by means of magnet, suction cup, or tape. The cover 72 can, like the cover 20 of the first exemplary embodiment pad 60, be fashioned of similar or dissimilar material according to purpose and contain within it any number of cushions 32. Additionally, the pad 70 is designed to cover larger surface areas while conserving on magnet 40 or suction cup 50 use since those items are relatively expensive. The pad 70 is designed using a concentration of magnets 40 and/or cups 50 installed along one edge, leaving the remainder of the pad 70 to hang free. The pad 70 is preferably sectioned in such manner as to allow for folding in order to facilitate storage. The number and size of sections are to be determined according to purpose and can vary beyond the illustrated three sections.

Second exemplary embodiment pads 70 are designed to work in unison with first exemplary embodiment pads 60 as shown in FIG. 14. An additional feature of the second exemplary embodiment pads 70 is the ability to extend beyond a protected surface or be arranged in such a way as to not contact areas of a protected surface as shown in FIG. 15.

Figure 16:
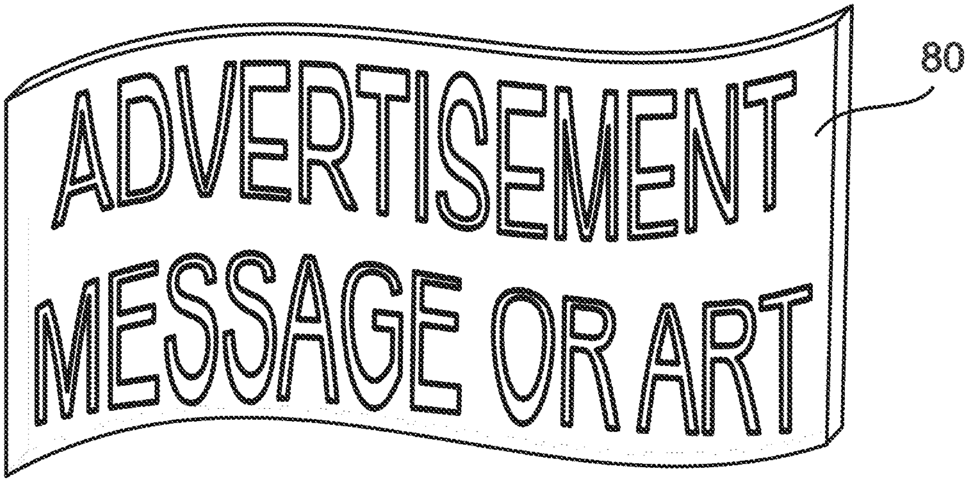
FIG. 16 is a perspective view of an alternate exemplary embodiment cover featuring a messaging or art display.

FIG. 16 depicts an alternative exemplary embodiment cover featuring a messaging or art display 80.

Figure 17:
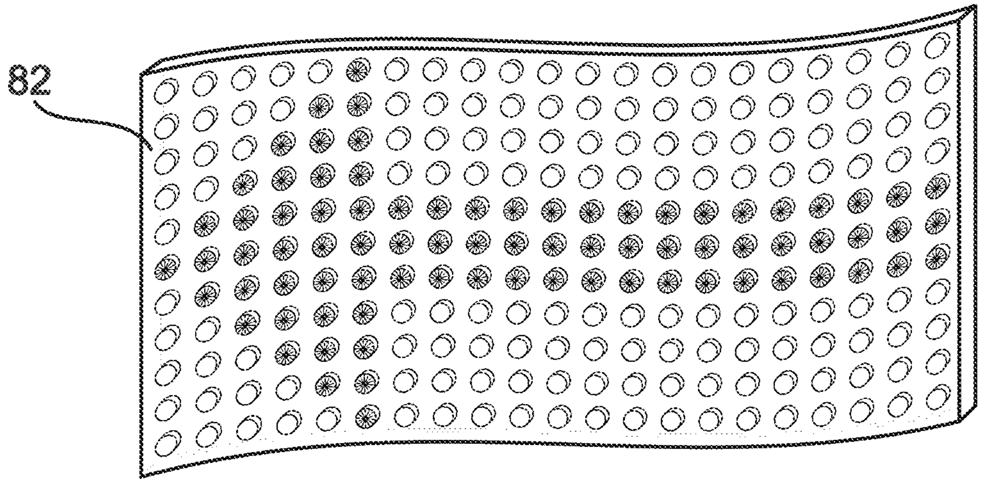
FIG. 17 is a perspective view of an alternate exemplary embodiment cover adapted to supporting a lighting grid.

FIG. 17 depicts an alternative exemplary embodiment with a cover adapted to supporting an LED lighting grid 82.

Figure 18:
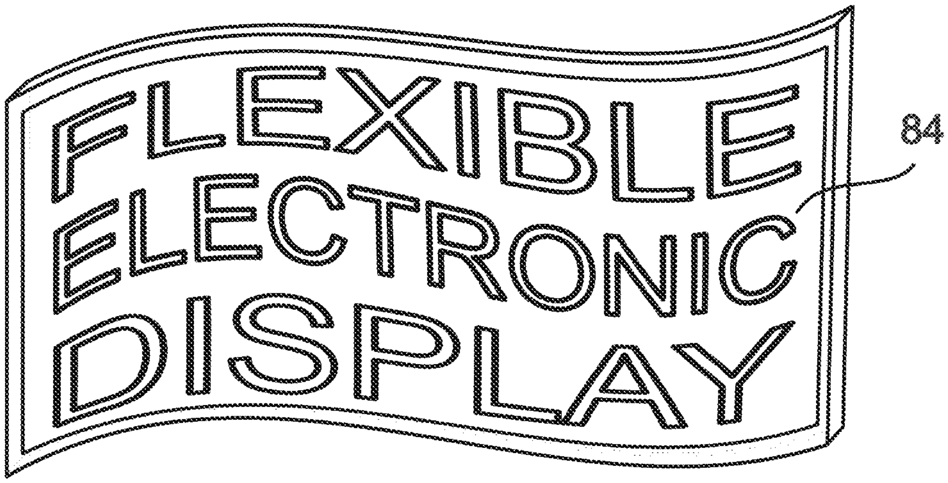
FIG. 18 is a perspective view of an alternate exemplary embodiment cover adapted to supporting a flexible electronic display.

FIG. 18 depicts an alternative exemplary embodiment with a cover adapted to providing a mounting surface for a technology such as a flexible Organic Light-Emitting Diode (OLED) video screen 84.

The cushion/cover combination aspect of the pads 60, 70 creates additional possibilities. As shown by way of non-limiting illustration in FIGS. 16-18, either exemplary embodiment pad 60, 70 can provide an effective means to attach and display advertising, lighting, messaging, or video content, for example. A cover 20, 72 can have a message imprinted upon it for artistic or advertising purposes. The cushion 30, 32 can be adapted to house a power source (not shown) for a cover 20, 72 which incorporates lighting or video screen content.

Thus, protective pads 60, 70 according to aspects of the present invention may incorporate additional uses not mentioned in the prior art. They are quick to adhere to any number of surfaces, can be flexible to match contours, and are light and easy to store. As such, especially if they have a removable or customizable cover 20, 72, they can be put to use as a means to hang curtains, welding blankets, or display items such as art, messages, advertising, small lights such as LEDs, or even flexible video screens. Such uses could provide emergency signage for a disabled automobile, business advertising, or a live video menu or entertainment display.

From the descriptions above, a number of advantages of various exemplary embodiments of a pad according to aspects of the present invention are evident. The pad being formed of a separable cover and cushion combination yields certain advantages:

First, the cover is able to be washed independent of the cushion. The most appropriate material for contact with fine finishes is soft-woven cloth. Such fabric can become fouled by materials attracted to magnets and generally, and separation from all magnetic force is necessary to permit thorough cleaning, including washing the cover in typical residential laundry equipment.

Second, the separability of cover and cushion enables a single cushion to be used with any number of alternate covers.

And third, a pad cover being separate and distinct from cushion materials allows for different degrees of looseness to be selected during construction. Such looseness can allow for cushions that can be doubled up within a cover, or a soft cushion can be paired with an additional stiff or durable material such as plywood or carbon fiber and yield entirely different protection qualities.

The pad cover being comprised of two adjoined sides permits composition from distinct materials depending on application. For instance, the exposed side could be composed of durable impact- and tear-resistant, fluid-repelling, tape-compatible canvas and the face side composed of soft-woven fabric. Alternately, the exposed side could be composed of heat-reflective fabric and the face side of flame retardant soft-woven fabric. Smooth or waterproof materials could be chosen for use in soiled or wet areas. Specialized materials such as felt, leatherette, or color-changing fabrics can be used on the exposed side of a cover in order to indicate if contact, impact, heat, liquids, or other threats have been presented to a protected surface. Such indications can lead to earlier inspection and resolution of problems.

Magnet placement within, as opposed to upon, a cushion not only secures the magnet but enables offset placement in terms of height or depth within the pad. Offset placement permits a user to choose from two separate magnetic pull forces when such a cushion is inserted within a cover. For instance, if a magnet is placed deep within a cushion and close to one face or side of the cushion, it will exert a greater pull at that closer face than if the cushion is flipped over within the cover and applied again to the same surface. This permits covers of different thicknesses and qualities to be used on the same cushion with consistent results. Exceptionally strong magnets appropriate to thick cover materials can be used in a cushion, yet that same cushion can be flipped over and inserted within a very thin cover material and yield the same properties in terms of application force of the pad on a surface to be protected.

Intentional orientation of magnets in terms of their poles enables optimal attachment behaviors. A magnet will be attracted to a ferrous surface regardless of which pole (north or south) is presented to the surface. However, when two or more magnets are presented to each other, the poles, whether north or south, all need to be in the same orientation such that two norths or two souths are not presented to each other because they will repel instead of attract. Thus, magnets that are placed with non-standardized pole orientation will yield a pad that attracts at one point and repels at another. When cushions are all standardized to have matched pole alignment, pads can placed atop each other.

Providing means for using both magnets and suction cups results in a much more versatile or broadly usable pad. Such pads can eliminate the problems associated with straps, hooks, and double-sided tape. Additionally, some fabrics are problematic when used with tapes, yet the cover options allow selection of tape-compatible material if wanted. Conversely, if tape is not needed or desired for a particular task, materials that are not tape-compatible can be chosen if they serve a more important role.

Attachable pads allow for another important operation. Whenever conventional large covers are used, they are typically not adhered directly to the protected surface but are held on by straps or elastic or other loose means. When used outdoors, such covers can be whipped by the wind and cause considerable wear and abrasion. By placing pads directly upon the protected surface, beneath such a conventional large vehicle cover or the like, or between the surface to be protected and the conventional cover, the pads thereby protect the surface from abrasive effects of relative movement of the large outer cover.

The second exemplary embodiment pads can cover more surface area at a reduced cost. Magnets and suction cups are relatively expensive, so concentrating them to one edge of a pad can provide adequate connection to the protected surface yet still cover a large area. The rest of the pad can be composed simply of cushion material arranged however best determined. The second exemplary embodiment pads can be sectioned in such a way as to enable easy folding for storage.

The pads are designed to work as a system allowing for expanded applications:

Pads conjoined by magnets permit coverage of areas adjacent to an attached pad that lack a surface compatible with magnets, suction cups, or tapes.

Covers from one cushion can be swapped to another cushion. Cushions can be paired together and inserted into a single cover, yielding greater protective qualities.

Pads of one exemplary embodiment can support or connect to pads of a different exemplary embodiment.

Another exemplary embodiment includes use of a cover exterior such as brushed suede, felt, fuzz, or velvet, that can indicate whether the cover has been touched or impacted. This can provide visible evidence that something may have come in contact with the pad and that there is potential damage currently hidden beneath. Such a feature can make it easier to document damage and to develop methods to prevent future incidents.

Since the pads provide convenient attachment to various surfaces, pad covers can be fashioned that provide a platform for printed messages, directions, advertising, electronic display screens, or lighting. For instance, a food truck operator could opt for a flexible Organic Light Emitting Diode (OLED) cover that displays an order ticket or scrolling menu. The ability of the pad to quickly adhere to the side of the truck would mean that after parking, the pad could be applied to the side of the truck for as long as needed, then later pulled off and stored inside the truck. In another example, a cover could be fashioned that included led lights appropriate to safety signage for a disabled automobile. Cushions could be fashioned to include receivers such as bluetooth or batteries for powering cover accessories.

In yet another exemplary embodiment, the face side of the cover is comprised of material utilizing anisotropic (van der Waals) adhesive forces in order to adhere to the protected surface. Such materials are under development and have demonstrated significant gripping capability. The advantages would include reduced pad weight due to the elimination of magnets, and a potential for much greater holding forces. Additionally, the pad cover would not be subjected to potential metallic shaving contamination.

In still yet another exemplary embodiment, the pads could be tailored to provide a quick, compact, and effective mounting means for utilitarian items such as curtains, shades, banners, flags, art, ornaments, signs, welding blankets, and anti-ballistic cloth.

It will be appreciated that any such pad-based surface protection system according to aspects of the present invention may involve such pads sold in sets or individually and that any such sheets of cushion, covers, and components such as suction cups for one or more pads and any other utilitarian items or accessories may also be sold together as a unit or kit or separately, as appropriate to the circumstance.

Aspects of the present specification may also be described as the following numbered embodiments:

1. A pad-based surface protection system comprising one or more pads, each pad comprising: one or more sheets of cushion; a plurality of magnets of predetermined size and lateral spacing selectively positioned at a predetermined depth within the one or more sheets of cushion; and a cover removably and selectively receiving the one or more sheets of cushion, the cover comprised of a face side and an opposite exposed side joined so as to allow the cover to fit on the one or more sheets of cushion, the face and exposed sides of the cover formed of textile materials.

2. The system of embodiment 1 wherein for at least one of the one or more pads at least one of the one or more sheets of cushion is rigid.

3. The system of embodiment 1 or embodiment 2 wherein for at least one of the one or more pads at least one of the one or more sheets of cushion is flexible.

4. The system of any of embodiments 1-3 wherein at least one of the one or more pads comprises at least two sheets of cushion, at least one of the at least two sheets of cushion being rigid and at least one of the at least two sheets of cushion being flexible.

5. The system of any of embodiments 1-4 wherein for at least one of the one or more pads the predetermined depth of one or more of the plurality of magnets within the one or more sheets of cushion is offset from a longitudinal central plane of the one or more sheets of cushion.

6. The system of any of embodiments 1-5 wherein for the one or more pads the plurality of magnets within the one or more sheets of cushion are oriented in terms of pole uniformity so as to enable two or more of the one or more pads to be adjoined via the plurality of magnets in the respective two or more pads in various alignments.

7. The system of embodiment 6 wherein the plurality of magnets are positioned along one edge of the one or more sheets of cushion and thus of each pad assembled as by inserting the one or more sheets of cushion within the cover.

8. The system of any of embodiments 1-7 wherein the face and exposed sides of the cover and the one or more sheets of cushion have holes which align in such manner when the one or more sheets of cushion are inserted within the cover that suction cups can be installed and secured through the assembled pad in one or more predetermined positions via the aligned holes.

9. The system of embodiment 8 wherein the suction cups are positioned along one edge of at least one of the one or more pads, each pad assembled as by inserting the one or more sheets of cushion within the cover, the aligned holes thus formed accordingly within the face and exposed sides of the cover and the one or more sheets of cushion.

10. The system of embodiment 8 or embodiment 9 wherein one or more of the suction cups are configured to enable attachment of a utilitarian item selected from the group consisting of flags, art, ornaments, curtains, shades, banners, signs, welding blankets, and anti-ballistic cloth.

11. The system of any of embodiments 1-10 wherein for at least one of the one or more pads the face side and the external side of the cover are composed of differing material types.

12. The system of any of embodiments 1-11 wherein for at least one of the one or more pads the exposed side of the cover displays one or more messages.

13. The system of any of embodiments 1-12 wherein for at least one of the one or more pads the exposed side of the cover supports lighting elements.

14. The system of any of embodiments 1-13 wherein for at least one of the one or more pads the exposed side of the cover supports video elements.

15. The system of any of embodiments 1-14 wherein for at least one of the one or more pads the one or more sheets of cushion incorporate a power source.

16. The system of any of embodiments 1-15 wherein for at least one of the one or more pads the plurality of magnets are positioned along one edge of the one or more sheets of cushion and thus of each pad assembled as by inserting the one or more sheets of cushion within the cover.

17. The system of any of embodiments 1-16 wherein for at least one of the one or more pads the face side of the cover is comprised of material having anisotropic adhesive properties.

18. The system of any of embodiments 1-17 wherein for at least one of the one or more pads one or more of the cover and the one or more sheets of cushion are comprised of anti-ballistic or heat resistant materials.

19. A method of employing the pad-based surface protection system of any of embodiments 1-18 to obtain a varied attractive force from the plurality of magnets installed within the one or more sheets of cushion of at least one of the one or more pads, the method comprising the steps of: placing one or more of the plurality of magnets at the predetermined depth within the one or more sheets of cushion offset from a longitudinal central plane of the one or more sheets of cushion; and inserting the one or more sheets of cushion within the cover such that the one or more of the plurality of magnets at the predetermined depth within the one or more sheets of cushion is closer to either the face side or the exposed side of the cover, whereby the at least one of the one or more pads is held with relatively greater magnetic force when the one or more sheets of cushion is inserted within the cover such that the predetermined depth is relatively closer to the face side of the cover and the face side of the cover is presented to a ferromagnetic surface, and further whereby the least one of the one or more pads is held with relatively lesser magnetic force when the one or more sheets of cushion is inserted within the cover such that the predetermined depth is relatively farther from the face side of the cover and the face side of the cover is presented to the ferromagnetic surface.

20. A method of employing the pad-based surface protection system of any of embodiments 1-18 to protect surfaces from an overlaying cover subjected to wind movement and subsequent abrasion, the method comprising the step of attaching the one or more pads to a protected surface underneath the overlaying cover that is subject to wind movement.

A pad system that provides greatly enhanced usability when it comes to the protection of certain equipment and surfaces is thus provided according to aspects of the present invention. For protection to be effective it must first be convenient. It must be easily constructed and repairable using ordinary means and materials. It must adhere reliably not only to a variety of surfaces, but whenever possible, to other pads of its own system. It must be cost efficient, easily cleansed, easily stored, and customizable to different applications. The described exemplary embodiments offer aspects of all of the foregoing advantages and can also be used for purposes such as the hanging of curtains, welding blankets, anti-ballistic materials, advertising messages, lighting arrays, and flexible video panel mounting.

The pad system according to aspects of the present invention also provides environmental, social, and economic values such as the prevention of reapplying toxic fillers and paints, repair and restoration savings to consumers and producers, and preservation of irreplaceable articles of art, industry, and heritage.

A protection pad system according to aspects of the present invention may be summarized as for at least one exemplary embodiment as including aspects of one or more of the following: compatible pads able to be held one to another by means of magnets; multiple means of attachment comprised of friction, magnetic, suction, anisotropic, or various types of tape; magnets installed in such manner that specific degrees of attractive force are selectable; removable covers which are washable in residential laundry equipment; selectable levels of impact protection; interchangeable covers; variable textile cover combinations for specific applications; interoperability of cushions, covers, and attachment methods; the ability to mount pads on vertical and inverted surfaces; the ability to use the pad system to support or suspend banners, ads, art, or protective shields such as welding blankets or anti-ballistic materials; and the ability to interconnect or overlay pads for increased coverage options. Additionally, pads can be stacked for greater impact protection or connected in a layered or hanging fashion to cover non-magnetic surface areas that otherwise could not be protected. Alternate uses are possible due to the pads' easy attachment methods and removable covers. Pad covers can be adapted to suit applications such as the display of advertising, lighting, or messaging, or even be paired with new technology such as flexible Organic Light-Emitting Display (OLED) video displays. Covers could also be comprised of materials capable of exerting anisotropic adhesive forces.

Aspects of the present invention can also be characterized as relating to a system of protection pads for vehicles, machines, appliances, delicately finished surfaces, or any such application where a surface needs protection. In accordance with at least one exemplary embodiment, the system features pads which are able to stack or link to each other and be quickly applied or removed, have covers easily removable for washing, and can be comprised of selectable qualities for particular applications. The system allows for impact, heat, and/or anti-ballistic protection, various attachment methods, vertical or inverted attachment, and means to attach flags, art, shades, or appliances such as welding blankets or anti-ballistic materials, for example. The system can also be used for purposes such as advertising, messaging, or video display. Additionally, because the pads adhere directly to a protected surface, they can be used to protect from wind abrasion effects when using whole-item protection devices such as car covers. Thus, a considerably versatile protection pad system is described.

Although the described system of protective pads contains certain specificities, these should not be construed to limit the scope of the exemplary embodiments presented, but as merely providing illustrations of some of several exemplary embodiments. Many other variations are possible. For example, the pads can have alternate shapes, be designed for a specific kind of panel or apparatus, have covers that are joined with velcro or zippers, or omit items such as magnets or suction cups if not needed for a particular application.

In closing, regarding the exemplary embodiments of the present invention as shown and described herein, it will be appreciated that a pad-based surface protection system is disclosed and configured for protecting surfaces from various hazards, undesired observation, and impacts or abrasions. Because the principles of the invention may be practiced in a number of configurations beyond those shown and described, it is to be understood that the invention is not in any way limited by the exemplary embodiments, but is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. A pad-based surface protection system comprising one or more pads, each pad comprising:

one or more sheets of cushion;

a plurality of magnets of predetermined size and lateral spacing selectively positioned at a common predetermined depth within the one or more sheets of cushion; and a cover fully removably and selectively receiving the one or more sheets of cushion, the cover comprised of a face side and an opposite exposed side joined so as to allow the cover to fit on the one or more sheets of cushion, the face and exposed sides of the cover formed of textile materials.

2. The system of claim 1 wherein for at least one of the one or more pads the common predetermined depth of the plurality of magnets within the one or more sheets of cushion is offset from a longitudinal central plane of the one or more sheets of cushion.

3. The system of claim 1 wherein for the one or more pads the plurality of magnets within the one or more sheets of cushion are oriented in terms of pole uniformity so as to enable two or more of the one or more pads to be adjoined via the plurality of magnets in the respective two or more pads in various alignments.

4. The system of claim 3 wherein the plurality of magnets are positioned along one edge of the one or more sheets of cushion and thus of each pad assembled as by inserting the one or more sheets of cushion within the cover.

5. The system of claim 1 wherein the face and exposed sides of the cover and the one or more sheets of cushion have holes which align in such manner when the one or more sheets of cushion are inserted within the cover that suction cups can be installed and secured through the assembled pad in one or more predetermined positions via the aligned holes.

6. The system of claim 5 wherein the suction cups are positioned along one edge of at least one of the one or more pads, each pad assembled as by inserting the one or more sheets of cushion within the cover, the aligned holes thus formed accordingly within the face and exposed sides of the cover and the one or more sheets of cushion.

7. The system of claim 5 wherein one or more of the suction cups are configured to enable attachment of a utilitarian item selected from the group consisting of flags, art, ornaments, curtains, shades, banners, signs, welding blankets, and anti-ballistic cloth.

8. The system of claim 1 wherein for at least one of the one or more pads the face side and the external side of the cover are composed of differing material types.

9. The system of claim 1 wherein for at least one of the one or more pads the plurality of magnets are positioned along one edge of the one or more sheets of cushion and thus of each pad assembled as by inserting the one or more sheets of cushion within the cover.

10. The system of claim 1 wherein for at least one of the one or more pads the face side of the cover is comprised of material having anisotropic adhesive properties.

11. A method of employing the pad-based surface protection system of claim 1 to obtain a varied attractive force from the plurality of magnets installed within the one or more sheets of cushion of at least one of the one or more pads, the method comprising the steps of:

placing the plurality of magnets at the common predetermined depth within the one or more sheets of cushion offset from a longitudinal central plane of the one or more sheets of cushion; and inserting the one or more sheets of cushion within the cover such that the plurality of magnets at the common predetermined depth within the one or more sheets of cushion is closer to either the face side or the exposed side of the cover, whereby the at least one of the one or more pads is held with relatively greater magnetic force when the one or more sheets of cushion is inserted within the cover such that the common predetermined depth is relatively closer to the face side of the cover and the face side of the cover is presented to a ferromagnetic surface, and further whereby the least one of the one or more pads is held with relatively lesser magnetic force when the one or more sheets of cushion is inserted within the cover such that the common predetermined depth is relatively farther from the face side of the cover and the face side of the cover is presented to the ferromagnetic surface.

12. A pad-based surface protection system comprising one or more pads, each pad comprising:

one or more sheets of cushion; and a cover fully removably and selectively receiving the one or more sheets of cushion, the cover comprised of a face side and an opposite exposed side joined so as to allow the cover to fit on the one or more sheets of cushion, the face and exposed sides of the cover formed of textile materials, wherein for at least one of the one or more pads the face side of the cover is at least partially comprised of material having anisotropic adhesive properties.

13. The system of claim 12 wherein for at least one of the one or more pads at least one of the one or more sheets of cushion is rigid.

14. The system of claim 12 wherein for at least one of the one or more pads at least one of the one or more sheets of cushion is flexible.

15. The system of claim 12 wherein at least one of the one or more pads comprises at least two sheets of cushion, at least one of the at least two sheets of cushion being rigid and at least one of the at least two sheets of cushion being flexible.

16. The system of claim 12 wherein for at least one of the one or more pads the one or more sheets of cushion incorporate a power source.

17. The system of claim 12 wherein for at least one of the one or more pads one or more of the cover and the one or more sheets of cushion are comprised of anti-ballistic or heat resistant materials.

18. A method of employing the pad-based surface protection system of claim 12 to protect surfaces from an overlaying cover subjected to wind movement and subsequent abrasion, the method comprising the step of attaching the one or more pads to a protected surface underneath the overlaying cover that is subject to wind movement.

* * * * *